ދ3,278,636
Patented Oct. 11, 1966

3,278,636
THERMOSETTING COMPOSITIONS OF CARBOXYL TERMINATED POLYESTERS AND DIGLYCIDYL ETHERS
John Wynstra, Berkeley Heights, N.J., assignor to Union Carbide Corporation, a corporation of New York
No Drawing. Filed June 21, 1960, Ser. No. 37,567
4 Claims. (Cl. 260—835)

This invention relates to thermosetting compositions of polyesters and liquid diglycidyl ethers of dihydric phenols. More particularly, this invention relates to thermosetting compositions of polyesters and liquid diglycidyl ethers of dihydric phenols whose physical properties can be varied as desired, so that upon being thermoset, the compositions have the desired degree of hardness, toughness, stiffness, adhesiveness, and the like.

Conventionally, thermosetting compositions based on polyepoxides, such as the diglycidyl ethers of dihydric phenols, have been admixed with so-called "modifiers" in order to formulate a composition which, when thermoset, will have the desired physical properties. For example, it is customary to add various polysulfides or polyamides to polyepoxides in order to improve the flexibility characteristics of the thermoset product.

The addition of such modifiers has proved to be undesirable, however, as the thermoset product of the resultant composition undergoes a degradation with respect to its physical properties on aging at relatively high temperatures, i.e., in excess of about 150° C. As an illustration, the thermoset product of a polyepoxide composition containing a polysulfide as a flexibilizer loses its toughness and its dielectric properties on aging at relatively high temperatures. In addition, the thermoset product becomes what best could be described as "cheesy."

The present invention provides compositions which, upon being thermoset, have the desired physical properties, as previously explained, and retain these properties even after aging at relatively high temperatures. The thermosetting compositions of the present invention comprise a mixture of a carboxyl terminated polyester having a carboxyl functionality of greater than two, a base, and a liquid diglycidyl ether of a dihydric phenol.

The carboxyl terminated polyesters which are admixed with a base and a liquid diglycidyl ether of a dihydric phenol to produce the compositions of this invention are the reaction products of a dibasic aliphatic fatty acid, an aliphatic dihydric alcohol, and a trifunctional compound such as a trihydric aliphatic alcohol or a tribasic aliphatic acid. Suitable polyesters can be formed by reacting a mixture containing the above-identified reactants as is described subsequently and also as described in the examples of this specification. The reactants are admixed in amounts and reacted to a degree such that the polyester produced is terminated by carboxyl groups and has a carboxyl functionality in excess of 2, preferably from 2.01 to 3.5 inclusive. Carboxyl functionality is the numerical value of the number of free carboxyl groups per average molecule of polyester.

Carboxyl functionality ($f_{\text{COOH}}$) is determined by the use of the equation:

$$f_{\text{COOH}} = \frac{C - AN/ANo}{N - C(1 - AN/ANo)}$$

wherein:
$C$ = total number of equivalents of COOH groups at the start of the reaction
$N$ = total number of moles in the reaction mixture at the start of the reaction
$AN$ = acid value of the polyester
$ANo$ = acid value at the start of the reaction "Acid value" can be expressed in milliequivalents per gram, obtained by multiplying the volume of sodium hydroxide (in milliliters) required to neutralize a given sample by its normality and dividing the product by the weight of the sample (in grams). Using phenolphthalein as the indicator, the end point of the neutralization reaction is indicated by a pink color.

The carboxyl terminated polyesters can be conveniently prepared by reacting a mixture containing a dibasic, aliphatic fatty acid, an aliphatic dihydric alcohol, and a trifunctional compound, such as a trihydric aliphatic alcohol or a tribasic aliphatic acid wherein the amount of reactants is such that there is present in the mixture, before any reaction has taken place, from about 1.05 to about 2 carboxyl equivalents per hydroxyl equivalent and preferably from about 1.05 to about 1.5 carboxyl equivalents per hydroxyl equivalent. The mixture is reacted until the polyester produced, which is terminated by carboxyl groups, has a carboxyl functionality of more than 2 but not more than 3.5. A carboxyl terminated polyester having a carboxyl functionality of 2 or less or greater than 3.5 is generally undesirable for purposes of the present invention. A composition of a liquid diglycidyl ether of a dihydric phenol, a base, and a carboxyl terminated polyester which has a carboxyl functionality of 2 or less will not thermoset, that is, will not reach a condition of rigidity and rather than swell in aromatic hydrocarbons such as xylene and benzene will dissolve therein. A composition containing a carboxyl terminated polyester having a carboxyl functionality greater than 3.5, when thermoset will be undesirably "cheesy" and crumbly.

Illustrative of suitable dibasic, aliphatic fatty acids are those having the general formula R—(COOH)$_2$ wherein R is a hydrocarbon radical having a minimum of two carbon atoms. Among such acids are included the dibasic, aliphatic, saturated acids such as succinic, glutaric, adipic, pimelic, suberic, azelaic, sebacic, and the like, as well as mixtures thereof. Also satisfactory for purposes of this invention are mixtures of dibasic acids, such as produced by the dimerization of linoleic acid, soya acids, and the like wherein each acid molecule contains an average of at least two COOH groups.

Among suitable aliphatic dihydric alcohols are those having the general formula HOCHR$_1$(CH$_2$)$_n$OH wherein $n$ has a value of at least one and preferably a value of 1 to 20 inclusive and R$_1$ is hydrogen or an alkyl radical preferably containing from 1 to 20 carbon atoms. Specific compounds include, among other, ethylene glycol, propylene glycol, butanediol-1,2, butanediol-1,3-butanediol-1,4, hexanediol-1,6, decanediol-1,10, and the like. Also suitable are the ether diols having the general formula HO—(C$_a$H$_{2a}$O)$_x$H wherein $a$ has a value of at least 2, preferably 2 to 6 inclusive, and $x$ has a value of at least 1, preferably 1 to 10 inclusive. Compounds which come within this general formula are diethylene glycol, dipropylene glycol, triethylene glycol, and the like.

Suitable polyfunctional compounds can be either polyhydric alcohols or polycarboxylic acids. Examples of the former include the trihydric aliphatic alcohols, such as glycerol, 1,2,6-hexanetriol, mannitol, pentaerythritol, and the like. Examples of the latter include the tricarboxylic aliphatic acids, such as tricarballylic acid and the higher molecular weight polycarboxylic acids having at least three carboxyl groups per molecule derived from the heat polymerization of drying acids.

The liquid diglycidyl ethers of dihydric phenols which are admixed with the polyesters to produce the compositions of the present invention can be conveniently prepared by reacting in an alkaline medium a dihydric phenol with at least four moles of epichlorohydrin per mole of the dihydric phenol. By way of illustration, 228 parts by weight (1 mole) of 2,2-bis(p-hydroxyphenyl)-propane were dissolved in a mixture containing 800 parts by weight water, eighty parts by weight (2 moles) sodium hydroxide and 400 parts by weight ethanol and the resultant solution added to a mixture of 400 parts by weight (4.31 moles) epichlorohydrin dissolved in 400 parts by weight ethanol, while the temperature was maintained at about 50° C. The dihydric phenol was added to the epichlorohydrin slowly so that the epichlorohydrin was maintained in excess during the reaction. The reaction mixture was then heated at a temperature of 80° C. for about one hour. Excess epichlorohydrin and ethanol were removed from the reaction mixture by distillation. The liquid residue was washed with caustic solution and water, removing therefrom chloride salt and other water-soluble impurities. The liquid diglycidyl ether of 2,2-bis(p-hydroxyphenyl)propane which remained was further purified by distillation wherein it was collected as a fraction boiling at 230° C. to 270° C. at a reduced pressure of 0.5 to 0.7 mm. Hg. The liquid diglycidyl ether produced, had the structural formula:

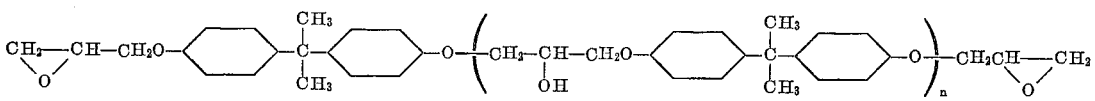

wherein n had a value of 0.15.

Illustrative of dihydric phenols which can be reacted with epichlorohydrin to produce liquid diglycidyl ethers include among others the mononuclear dihydric phenols such as hydroquinone, catechol, resorcinol, and the like; the polynuclear dihydric phenols, such as the bis-(p-hydroxyphenyl)alkanes among which can be noted bis(p-hydroxyphenyl)methane, 1,1 - bis(p - hydroxyphenyl) ethane, 2,2 - bis(p - hydroxyphenyl)propane, 2,2 - bis (p-hydroxyphenyl)butane, and the like; dihydric phenols which have alkyl, aryl, and/or halogen ring substituents. These latter compounnds are exemplified by the methyl resorcinols, the tribromo resorcinols, and the substituted bisphenols disclosed in Bender, et al., 2,506,486 which is incorporated herein by reference. A preferred liquid diglycidyl ether for purposes of this invention has the general formula:

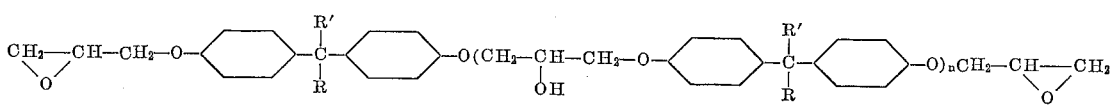

wherein n has a value of 0 to 1 inclusive, R and R' are hydrogen or alkyl groups, preferably alkyl groups having a maximum of four carbon atoms. The alkyl groups can be the same or different.

The bases which are used in admixture with the diglycidyl ethers and the polyesters are those which are capable of reacting with the free carboxyl groups of the polyester to form carboxylate groups. Among such bases are primary, secondary, and tertiary organic amines, alkali metal hydroxides, alkali metal phenoxides, alkali metal salts of fatty acids, particularly those acids having a maximum of 20 carbon atoms, and quaternary ammonium compounds.

Illustrative of suitable amines are α-methyl benzyl dimethyl amine, α-methyl benzyl amine, dimethyl aniline, cyclohexyl amine, N-amino ethyl morpholine, N-amino propyl morpholine, ethyl amine, isopropyl amine, n-butyl amine, isobutyl amine, 2-ethyl hexyl amine, triethyl amine, monoethanol amine, monoisopropanol amine, and the like. Among suitable alkali metal hydroxides, alkali metal phenoxides and alkali metal salts of fatty acids are sodium hydroxide, potassium hydroxide, lithium hydroxide, sodium phenoxide, potassium phenoxide, sodium acetate, potassium acetate, sodium naphthenate, potassium naphthenate, lithium naphthenate, and the like. Exemplary of quaternary ammonium compounds are tetramethyl ammonium chloride, benzyl trimethyl ammonium chloride, tetraethanol ammonium chloride, dodecyl dimethyl benzyl ammonium naphthenate, and the like. Other suitable quaternary ammonium compounds are enumerated in U.S. Patent 2,772,296 to A. C. Mueller, which is incorporated herein by reference. Particularly preferred for purposes of this invention are the tertiary organic amines.

The thermosetting compositions of this invention are conveniently prepared by admixing the polyester and the liquid diglycidyl ether in the following proportions: 0.8 to 1.2, inclusive equivalents of polyester, based on its carboxyl groups per equivalent of diglycidyl ether, based on its epoxy groups and adding thereto a catalytic amount of base. The base catalyzes the cross-linking reaction between the polyester and the diglycidyl ether. Generally, from about 0.02 to about 0.20 mole of base per equivalent of diglycidyl ether is sufficient for this purpose. Using more than about 0.20 mole of base per equivalent of diglycidyl ether does not materially decrease the time within which the composition will thermoset. The actual proportions of polyester, and diglycidyl ether of each composition will depend upon the hardness, toughness, stiffness, and adhesiveness desired in the thermoset products of such compositions.

Usually, the compositions of this invention are thermoset by subjecting them to temperatures in excess of about 45° C. Room temperatures, i.e., about 20° C., can be employed, but as a practical matter the time required in order to thermoset the compositions at these temperatures becomes unduly lengthy. The actual temperatures used and consequently the duration of the heating cycles will depend upon the formulation of each composition.

If desired, colorants, mold release agents, pigments, oxidizing agents, and other such material can be added to the compositions of the present invention. The exact material added will depend upon the end use requirements of the compositions.

The compositions of this invention can be used as adhesives for uniting aluminum and other such metals, as encapsulating material for electrical components, as protective coatings on metal surfaces and as binders for solid rocket propellants.

The following examples further illustrate the present invention and are not intended to limit the scope thereof in any manner.

EXAMPLE 1

*Preparation of polyesters A, B, and C*

The following materials were charged into a round bottomed flask:

| | Amount in moles: |
|---|---|
| Diethylene glycol | 5.1 |
| Glycerol (98%) | 0.9 |
| Adipic acid | 7.2 |

Values of N, C, ANo of the mixture at the start of the reaction were N=13.2; C=14.4; ANo=9.94 meq./g.

To this mixture was then added 85 grams of xylene and the resultant mixture was heated at reflux. This procedure was repeated three times using the same reactants in the amounts noted above. Polyester was isolated in each instance by vacuum stripping off the xylene at the acid values noted below:

| Polyester | AN | Calculated $f_{COOH}$ | Viscosity at 25° C. in Centistokes |
|---|---|---|---|
| A | 1.84 meq./g | 1.83 | 3,200 |
| B | 1.36 meq./g | 2.56 | 15,000 |
| C | 1.20 meq./g | 3.24 | 76,000 |

*Preparation of thermosetting compositions of polyester and liquid diglycidyl ether*

Polyesters A, B, and C were each admixed with stoichiometric amounts of diglycidyl ether of 2,2-bis(p-hydroxyphenyl) propane having an epoxy equivalent weight of about 190, that is, admixed in amounts sufficient to provide one epoxide group per carboxyl group. To each composition was then added 1% by weight based on the weight of polyester and epoxy, benzyl dimethyl amine. Each composition was placed in an aluminum cup and heated for 30 minutes at 135° C. Properties of each composition are noted below:

| | Composition | Combining weight ratio of polyester to epoxy | Shore "A" hardness | Other properties |
|---|---|---|---|---|
| 1 | Polyester A + base and diglycidyl ether | 74 to 26 | 0 | Did not thermoset. |
| 2 | Polyester B + base and diglycidyl ether | 79 to 21 | 22 | Thermoset, rubbery, flexible, and tough. |
| 3 | Polyester C + base and diglycidyl ether | 81 to 19 | 35 | Thermoset, less rubbery and flexible than Composition 2. |

As indicated, Composition 1 did not thermoset. This can be attributed to the fact that the polyester used in the composition had a functionality of less than 2.

EXAMPLE 2

*Preparation of polyesters D and E*

The following materials were charged into round bottomed flasks and polyesters prepared and recovered in a manner as described in Example 1.

Polyester D was prepared by refluxing a mixture of:

Amount in moles:
Diethylene glycol _____ 7.50
Glycerol (95%) _____ 0.375
Adipic acid _____ 9.00
Xylene (149 grams) _____

Values of N, C, and $AN_o$ of the mixture at the start of the reaction were N=16.87; C=18; and $AN_o$=9.701 meq./g.

Polyester D had:
An AN of 1.18 meq./g.
A $f_{COOH}$ of 2.05
A viscosity at 25° C. of 11,700 centistokes
And a combining weight of 848 g./COOH Polyester E was prepared by refluxing a mixture of:

Amount in moles:
Diethylene glycol _____ 5.00
Glycerol (95%) _____ 1.50
Adipic acid _____ 8.50
Xylene (132 grams) _____

Values of N, C, and $AN_o$ at the start of the reaction were N=15.0; C=17; and $AN_o$=10.306 meq./g.

Polyester E had:
An AN of 1.80 meq./g.
A $f_{COOH}$ of 3.07
A viscosity at 25° C. of 35,200 centistokes
And a combining weight of 556 g./COOH Polyesters D and E were combined in varying amounts with a stoichiometric amount of diglycidyl ether of 2,2-bis(p-hydroxyphenyl)propane, described in Example 1. Resultant compositions and the properties of each composition are noted below:

| Composition | Weight in grams | | | | |
|---|---|---|---|---|---|
| | 4 | 5 | 6 | 7 | 8 |
| Polyester D | 0 | 21.2 | 42.4 | 63.6 | 84.8 |
| Polyester E | 55.6 | 41.7 | 27.8 | 13.9 | 0 |
| Diglycidyl Ether | 19.4 | 19.4 | 19.4 | 19.4 | 19.4 |
| Benzyl dimethyl amine | 0.75 | 0.82 | 0.90 | 0.97 | 1.04 |
| $f_{COOH}$ | 3.07 | 2.86 | 2.56 | 2.30 | 2.05 |
| Shore "A" hardness when thermoset one hour at 50° C | 50 | 40 | 32 | 14 | 10 |
| Shore "A" hardness when thermoset four days at 50° C | 15 | 10 | | | |

EXAMPLE 3

*Preparation of Polyester F*

The following materials were charged into a round bottomed flask and the polyester prepared and recovered in a manner described in Example 1.

Amount in grams:
Diethylene glycol _____ 204.2
Glycerol (95%) _____ 33.9
Dimerized soya acid _____ 1500
Xylene _____ 87

Polyester F had:
An AN of 0.66 meq./g.
$f_{COOH}$ of 2.4
Combining weight of 1515 g./COOH
A viscosity at 25° C. of 108,000 centistokes
And a viscosity at 50° C. of 16,300 centistokes Polyester F was admixed with the diglycidyl ether of 2,2-bis(p-hydroxyphenyl)propane described in Example 1 in a weight ratio of 89 to 11. A mixture containing the 89 to 11 ratio of polyester F and diglycidyl ether plus one percent by weight benzyl dimethyl amine, based on the weight of the polyester and the diglycidyl ether, was thermoset to a soft, rubbery product having a Shore "A" hardness of 10 by heating for one hour at 150° C.

A second identical mixture was thermoset to a soft, rubbery product having a Shore "A" hardness of 6 by heating for four days at 50° C.

The dimerized soya acid noted in this example was composed of 71 percent by weight dicarboxylic acid having 26 carbon atoms, 26 percent by weight tricarboxylic acid having 54 carbon atoms and 3 percent by weight monocarboxylic acid having 18 carbon atoms.

What is claimed is:

1. A thermosetting composition comprising a carboxyl terminated polyester having a carboxyl functionality of greater than 2 and not more than 3.5 and being the reaction product of a mixture containing adipic acid, diethylene glycol and glycerol; a liquid diglycidyl ether of 2,2-bis(p-hydroxyphenyl)propane and a catalytic amount of benzyldimethylamine, wherein there is present in said composition 0.8 to 1.2 equivalents of said polyester per equivalent of said diglycidyl ether.

2. A thermosetting composition as defined in claim 1 wherein the carboxyl terminated polyester has a carboxyl functionality of from 2.01 to 3.5 inclusive.

3. A thermosetting composition as defined in claim 1 wherein the benzyldimethylamine is present in an amount of from 0.02 to about 0.20 mole per equivalent of diglycidyl ether.

4. The thermoset product of the composition defined in claim 1.

References Cited by the Examiner

UNITED STATES PATENTS

| | | | |
|---|---|---|---|
| 1,998,744 | 4/1935 | Ubben | 260—22 |
| 2,598,663 | 6/1952 | Kropa | 260—22 |
| 2,623,023 | 12/1952 | Koroly | 260—2.5 |
| 2,683,131 | 7/1954 | Cass | 260—835 |
| 2,691,007 | 10/1954 | Cass | 260—45.4 |
| 2,698,308 | 12/1954 | Crecelius | 260—47 |
| 2,712,535 | 7/1955 | Fisch | 260—47 |
| 2,944,996 | 7/1960 | Berenbaum | 260—45.4 |
| 2,957,837 | 10/1960 | Smith et al. | 260—22 |
| 3,027,279 | 3/1962 | Kurka et al. | 260—835 |
| 3,057,824 | 10/1962 | Le Bras et al. | 260—22 |

FOREIGN PATENTS 544,554  8/1957  Canada.

LEON J. BERCOVITZ, Primary Examiner.

ALFONSO D. SULLIVAN, MILTON STERMAN, DONALD E. CZAJA, Examiners.

H. LEVINE, J. W. BEHRINGER, R. W. GRIFFIN, Assistant Examiners.